United States Patent [19]

Nishikawa

[11] Patent Number: 4,648,378
[45] Date of Patent: Mar. 10, 1987

[54] ROASTER

[75] Inventor: Eikichi Nishikawa, Moriguchi, Japan

[73] Assignee: Yamaoka Industry Corporation, Osaka, Japan

[21] Appl. No.: 816,877

[22] Filed: Jan. 7, 1986

[30] Foreign Application Priority Data

Mar. 15, 1985 [JP] Japan .............................. 60-37930[U]

[51] Int. Cl.4 ............................................. A21B 1/00
[52] U.S. Cl. .............................. 126/21 A; 126/299 F; 126/299 D
[58] Field of Search .............. 126/21 A, 21 R, 299 D, 126/39 E, 299 F, 300, 41 R; 99/400, 446; 98/115.1

[56] References Cited

U.S. PATENT DOCUMENTS

| 2,674,991 | 4/1954 | Schacter | 126/21 A |
|---|---|---|---|
| 3,367,320 | 2/1968 | Jenn et al. | 126/300 |
| 3,587,555 | 6/1971 | Cerola | 126/21 A |
| 3,596,650 | 8/1971 | Cerola | 126/300 |
| 3,712,819 | 1/1973 | Field | 126/21 A |
| 3,756,217 | 9/1973 | Field | 98/115.1 |
| 4,042,806 | 8/1977 | McCartney | 126/21 A |
| 4,411,254 | 10/1983 | Field et al. | 126/299 D |
| 4,413,611 | 11/1983 | Berlik et al. | 126/21 A |
| 4,428,357 | 1/1984 | Field | 126/299 D |
| 4,446,849 | 5/1984 | McFarland | 126/300 |
| 4,508,097 | 4/1985 | Berg | 126/299 D |
| 4,527,542 | 6/1985 | Bales et al. | 126/299 D |

Primary Examiner—Samuel Scott
Assistant Examiner—H. A. Odar
Attorney, Agent, or Firm—Wenderoth, Lind & Ponack

[57] ABSTRACT

A roaster for roasting meat is proposed. Smoke emitted by meat while it is roasted is drawn into a smoke intake flue through a pair of openings provided along and over the longitudinal edges of a rectangular griddle. Then the smoke is purified by a smoke purifier disposed under the griddle.

2 Claims, 4 Drawing Figures

ROASTER

BACKGROUND OF THE INVENTION

The present invention relates to a roaster adapted to treat smoke emitted by meat while it is roasted.

It has been a common practice to draw such smoke into an air duct for discharging it from within the room. However, it takes a great deal of trouble to install an air duct. Furthermore, the air duct has a disadvantage in that it cannot be moved.

SUMMARY OF THE INVENTION

It is an object of the present invention to provide a roaster which obviates the necessity for an air duct and yet can be used in the same way as ordinary roasters.

The roaster in accordance with the present invention includes an inner case mounted in an opening provided in the center of a top board, a griddle mounted on the upper edge of the inner case, a gas burner disposed under the griddle and within the inner case, and an outer case disposed outside the inner case so as to form a smoke intake flue therebetween. The smoke intake flue has openings along and over the longitudinal edges of the rectangular griddle. A smoke purifier is disposed under the outer case, and an electric-powered fan is disposed under the smoke purifier. The outer case, the smoke purifier and the fan are accommodated in a box-shaped support saddle in such a manner that the top board is supported by the support saddle and an exhaust flue is formed by a space left between the inner surface of the support saddle and the outer case, smoke purifier and far accommodated therin. The blowoff port of the fan is connected to the inlet port of the exhaust flue. The outlet ports of the exhaust flue are formed in each side wall of the support saddle.

With the above-described object in view and as will become apparent from the following detailed description, the present invention will be more clearly understood in connection with the accompanying drawings.

BRIEF DESCRIPTION OF THE DRAIWNGS

DETAILED DESCRIPTION OF THE INVENTION

Figure 1:
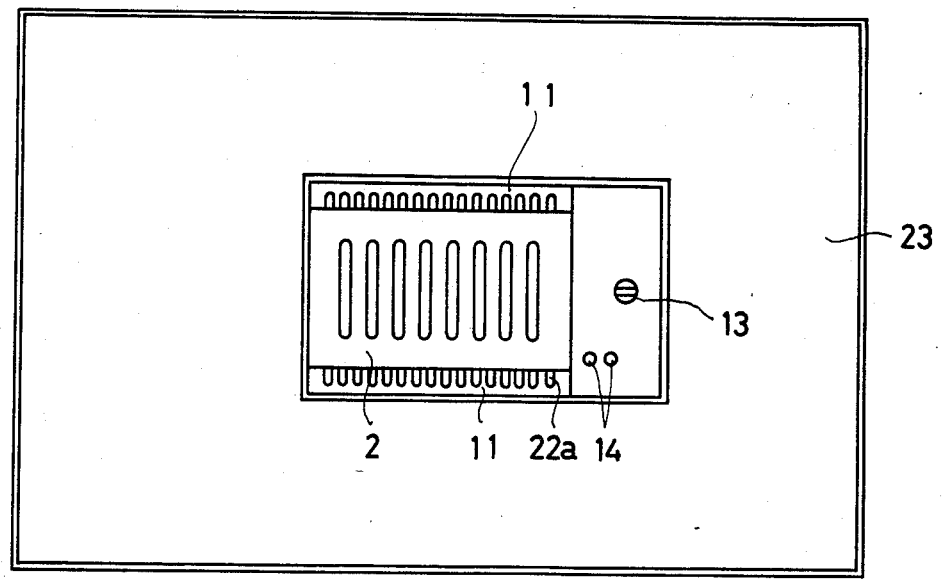
FIG. 1 is a plan view of an embodiment of the present invention.
Figure 2:
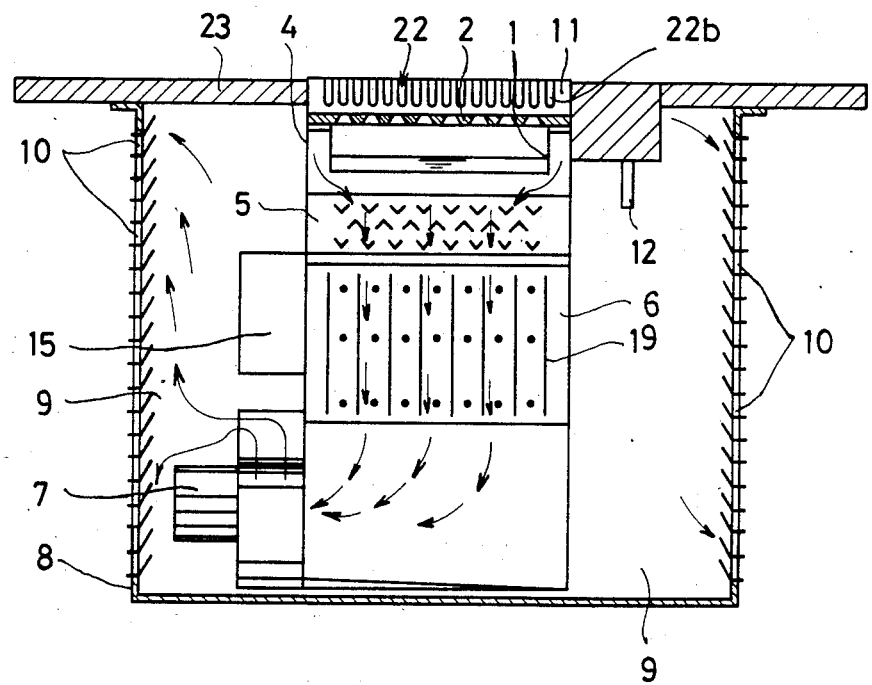
FIG. 2 is a vertical sectional front view thereof.
Figure 4:
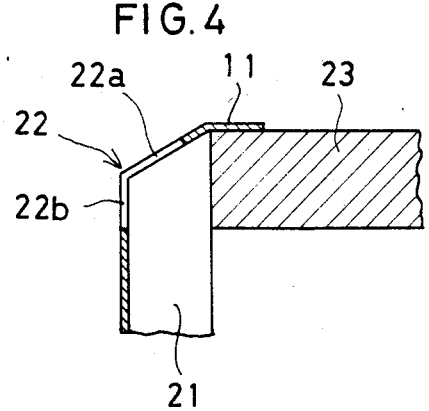
FIG. 4 is a vertical sectional side view of a part, illustrating a unique configuration of the smoke inlet port provided at the opening of the smoke inlet flue.

Referring now to the drawings, the roaster in accordance with the present invention includes an inner case 1 containing water and mounted in an opening provided in the center of a top board 23, a rectangular griddle 2 (which may be replaced by a grill) mounted on the upper edge of the inner case 1, a gas burner 3 in the form of a plurality of pipes disposed under the griddle 2 and within the inner case 1, and an outer case 4 disposed outside the inner case 1 so as to form a smoke intake flue 21 therebetween. The flue 21 has openinqs at the top thereof along and over the longitudinal edges of the rectangular griddle 2. These openinqs are covered with a pair of longitudinal members 11 having a dog-legged section and provided with a plurality of smoke inlet ports 22. Each port 22 is dog-legged so that it consists of an inclined portion 22a (FIGS. 1 and 4) adapted to mainly draw air into the flue 21 and a vertical portion 22b (FIGS. 2 and 4) adapted to mainly draw smoke and combustion gas into the flue 21.

Figure 3:
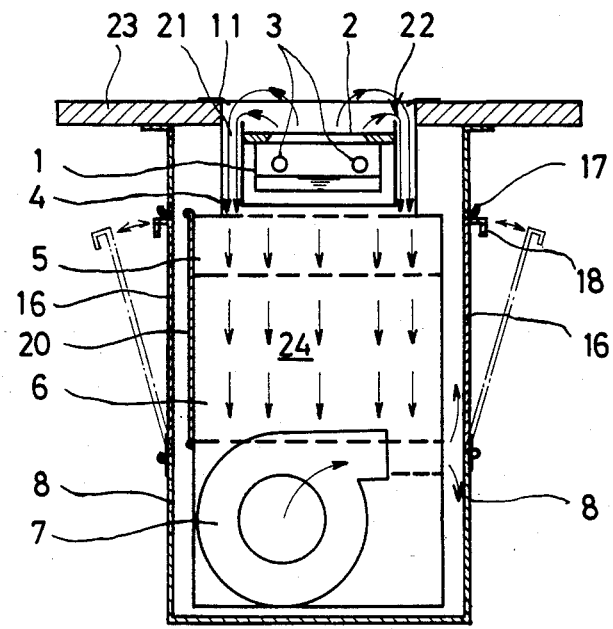
FIG. 3 is a vertical sectional side view thereof, illustrating the hinged flaps kept in a half-opened state to show the structure for keeping them closed.

A smoke purifier 24 (FIG. 3) is disposed under the outer case 4. An electric-powered fan 7 accompanied by a power source 15 (FIG. 2) is disposed under the smoke purifier 24. In the case of the embodiment shown in the drawings, the fan 7 takes the form of a sirocco fan. The outer case 4, the smoke purifier 24 and the fan 7 are accommodated in a box-shaped support saddle 8 in such a manner that the top board 23 is supported by the support saddle 8 and an exhaust flue 9 is formed by a space left between the inner surface of the support saddle 8 and the outer case 4, smoke purifier 24 and fan 7 accommodated therein. The blowoff port of the sirocco fan 7 is connected to the inlet port of the exhaust flue 9. The outlet ports 10 of the exhaust flue 9 are formed in the transverse side walls of the support saddle 8 so as to spaced from the smoke inlet ports 22. The purified mixture of smoke and air passes through the exhaust flue 9 and is spouted from the outlet ports 10 by the blowoff pressure of the sirocco fan 7.

The support saddle 8 supports a top board 23, and has an opening 12 through which a gas pipe extends into the support saddle 8. A cock 13 for starting, stopping or regulating the flow of gas and switches 14 for the sirocco fan 7 and the smoke purifier 24 are provided on the top board 23.

The smoke purifier 24 consists of a large particle collector 5 and a dust collector 6. If the smoke contains particles having comparatively large diameters, they are allowed to stick to the surfaces of walls provided in the large particle collector 5. If the smoke contains particles having comparatively small diameters, they are charged with electricity by dust collecting electrodes 19 in the dust collector 6 so as to be collected therein. Filters for the large particle collector 5 and the dust collector 6 can be replaced by openinq a hinged flap 16 provided on the support saddle 8 and an inner flap 20 provided on the outer case 4. The flap 16 has a handle 18, which can be engaged with a leaf spring 17 provided on the support saddle 8 for keeping the flap 16 closed.

In operation, meat is roasted on the griddle 2, and smoke (i.e., oil mist and carbon black) is emitted by the meat as a matter of course. When this smoke is drawn into the smoke intake flue 21 through the smoke inlet ports 22, the above-described unique configuration of the ports 22 permits the smoke to be blended with air. This has the effect of lowering the temperature of smoke and thereby preventinq the internal components from being heated to an abnormally high temperature. Then the mixture of smoke and air is admitted into the smoke purifier 24, from which the purified mixture is discharged to the outside through the exhaust flue 9 and the outlet ports 20.

Kinetic energy required for the flow of the mixture from the smoke inlet ports 22 to the outlet ports 10 is given by the sirocco fan 7. Since the outlet ports 10 are spaced from the smoke inlet ports 22, the possibility that the warm updraft discharged from the outlet ports 10 may cause the upward escape of the smoke emitted by the meat is precluded.

Before particles accumulate heavily in the large particle collector 5 and the dust collector 6, these collectors should be either washed or replaced with new ones periodically. This work can be easily done by opening the flap 16.

The outlet ports 10 are provided in the transverse side walls of the support saddle 8 because, otherwise, persons who sit at the longitudinal edges of the top board 23 for seasoning the roast meat would be exposed, especially in summer, to the purified but warm mixture of smoke and air discharged from these outlet ports 10.

The present invention has an advantage that the necessity for a duct for discharging the smoke from within the room can be obviated and yet the roaster in accordance with the present invention can be used in the same way as ordinary roasters.

What is claimed is:

1. A roaster in which smoke given off by food being cooked by said roaster is treated, comprising:
    a top board having an opening therethrough;
    an inner case mounted in said opening having a gas burner disposed therein;
    a rectangular griddle means mounted on top of said inner case;
    an outer case having wall means surrounding and spaced from said inner case for forming a smoke intake flue between said wall means and said inner case;
    smoke inlet ports located adjacent the periphery of said griddle means open to and communicating with said smoke intake flue;
    a smoke purifier means disposed under and coupled to said outer case;
    an electric powered fan disposed under and coupled to said smoke purifier means for drawing air and said smoke through said smoke inlet port, said intake flue and said smoke purifier means;
    a box shaped support saddle having walls for supporting said top board and surrounding said outer case, said smoke purifier means and said fan for forming a space between said walls and said outer case, said smoke purifier means and said fan, said fan expelling said air and said smoke drawn through said air purifier means into said space;
    said walls including transverse side walls having a plurality of outlet ports for allowing said air and said smoke drawn through said air purifier means and expelled into said space to pass outwardly therethrough.

2. A roaster as claimed in claim 1, wherein, said smoke inlet ports are comprised of members having first elongated openings extending in a vertical direction and second elongated openings each disposed above and continuous with a respective said first opening and extending in a direction inclined relative to said vertical direction.

* * * * *